US012625692B2

(12) United States Patent
Atur et al.

(10) Patent No.: US 12,625,692 B2
(45) Date of Patent: May 12, 2026

(54) DISK IMAGE DUMP FOR CONFIGURING BARE METAL SERVERS

(71) Applicant: Rakuten Symphony, Inc., Tokyo (JP)

(72) Inventors: Sree Nandan Atur, Newark, CA (US); Ravi Kumar Alluboyina, San Mateo, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/251,649

(22) PCT Filed: Nov. 29, 2022

(86) PCT No.: PCT/US2022/051203
§ 371 (c)(1),
(2) Date: May 3, 2023

(87) PCT Pub. No.: WO2024/118055
PCT Pub. Date: Jun. 6, 2024

(65) Prior Publication Data
US 2025/0284476 A1     Sep. 11, 2025

(51) Int. Cl.
*G06F 8/61*          (2018.01)
(52) U.S. Cl.
CPC ..................................... *G06F 8/63* (2013.01)
(58) Field of Classification Search
CPC ........ G06F 8/63; G06F 9/455; G06F 9/45541; G06F 21/575
See application file for complete search history.

(56) References Cited

U.S. PATENT DOCUMENTS

| | | | |
|---|---|---|---|
| 7,805,631 B2 | 9/2010 | Fries | |
| 8,209,680 B1 | 6/2012 | Le | |
| 8,312,115 B2 | 11/2012 | Lipscombe | |
| 8,347,137 B1 | 1/2013 | Chepel | |
| 8,601,226 B1 | 12/2013 | Lappas | |
| 9,210,100 B2 | 12/2015 | van der Linden | |
| 9,940,330 B2 | 4/2018 | Le | |
| 10,127,055 B2 | 11/2018 | Shih | |
| 11,928,034 B2 * | 3/2024 | Behera ................... | G06F 9/453 |
| 2013/0290694 A1 | 10/2013 | Civilini et al. | |
| 2020/0257519 A1 | 8/2020 | Shen | |
| 2020/0278915 A1 | 9/2020 | Degaonkar et al. | |
| 2020/0344326 A1 | 10/2020 | Ghosh | |
| 2021/0392039 A1 * | 12/2021 | Atur ........................ | H04L 67/34 |
| 2023/0004411 A1 * | 1/2023 | Li .............................. | G06F 8/63 |
| 2023/0409440 A1 * | 12/2023 | Behera ................ | H04L 41/0816 |

* cited by examiner

*Primary Examiner* — Marina Lee
(74) *Attorney, Agent, or Firm* — David R. Stevens; Stevens Law Group

(57)          ABSTRACT

Systems and methods for capturing a disk image of a bare metal server, and then using the disk image to provision other bare metal servers. A method includes capturing a disk image of a first bare metal server and writing the disk image to a repository manager. The method includes launching a continuous delivery mode on a second bare metal server where the disk image is fetched from repository manager and written to second bare metal server, followed by configuring the unique identity.

20 Claims, 14 Drawing Sheets

300

400

900

Bare Metal Server 902

Distributed File Store
522

Images 904

Artifacts 906

Cluster 518

Machine
Initialization Module
118

Worker 516

Workflow
Orchestrator 506

1100

DISK IMAGE DUMP FOR CONFIGURING BARE METAL SERVERS

TECHNICAL FIELD

This disclosure relates generally to configuring network systems and specifically relates to configuring a bare metal server with a disk image.

SUMMARY

Systems and methods for capturing a disk image of a bare metal server, and then using the disk image to provision other bare metal servers. A method includes capturing a disk image of a first bare metal server and writing the disk image to a repository manager. The method includes launching a continuous delivery mode on a second bare metal server where the disk image is fetched from repository manager and written to second bare metal server, followed by configuring the unique identity.

BACKGROUND

Numerous industries benefit from and rely upon cloud-based computing resources to store data, access data, and run applications and tasks based on the stored data. These systems often rely on storage and processing resources of numerous bare metal servers. In traditional systems, it is computationally expensive and time consuming to install an operating system on a new bare metal server and configure the new bare metal server for use. Additionally, these traditional systems must endure server downtime when servers are being provisioned and configured.

In view of the foregoing, disclosed herein are systems, methods, and devices for decreasing server downtime and reducing configuration time for new bare metal servers by configuring servers with a disk image.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Disclosed herein are systems, methods, and devices for capturing a disk image of a bare metal server, and then using the captured disk image to install operating systems on other bare metal servers. The methods described herein may be implemented with a copy/paste functionality to obtain high performance while keeping server reboots to a minimum.

In traditional systems, it is computationally expensive and time consuming to install an operating system on a bare metal server and then configure the bare metal server for use. Additionally, this process includes significant downtime when the bare metal server cannot be used to execute applications and workflows. Additionally, typical operating system provisioning kickstarter files are complex and include numerous components, including a pre-section, operating system installs, post-selection configuration, and one-time updated services. These kickstarter files can present numerous challenges when seeking to configure numerous bare metal servers for immediate use. In view of the foregoing, the systems, methods, and devices described herein enable users to initiate a workflow to capture a disk image of a first bare metal server, and then use the captured disk image to install and operating system on other bare metal servers.

Figure 1:
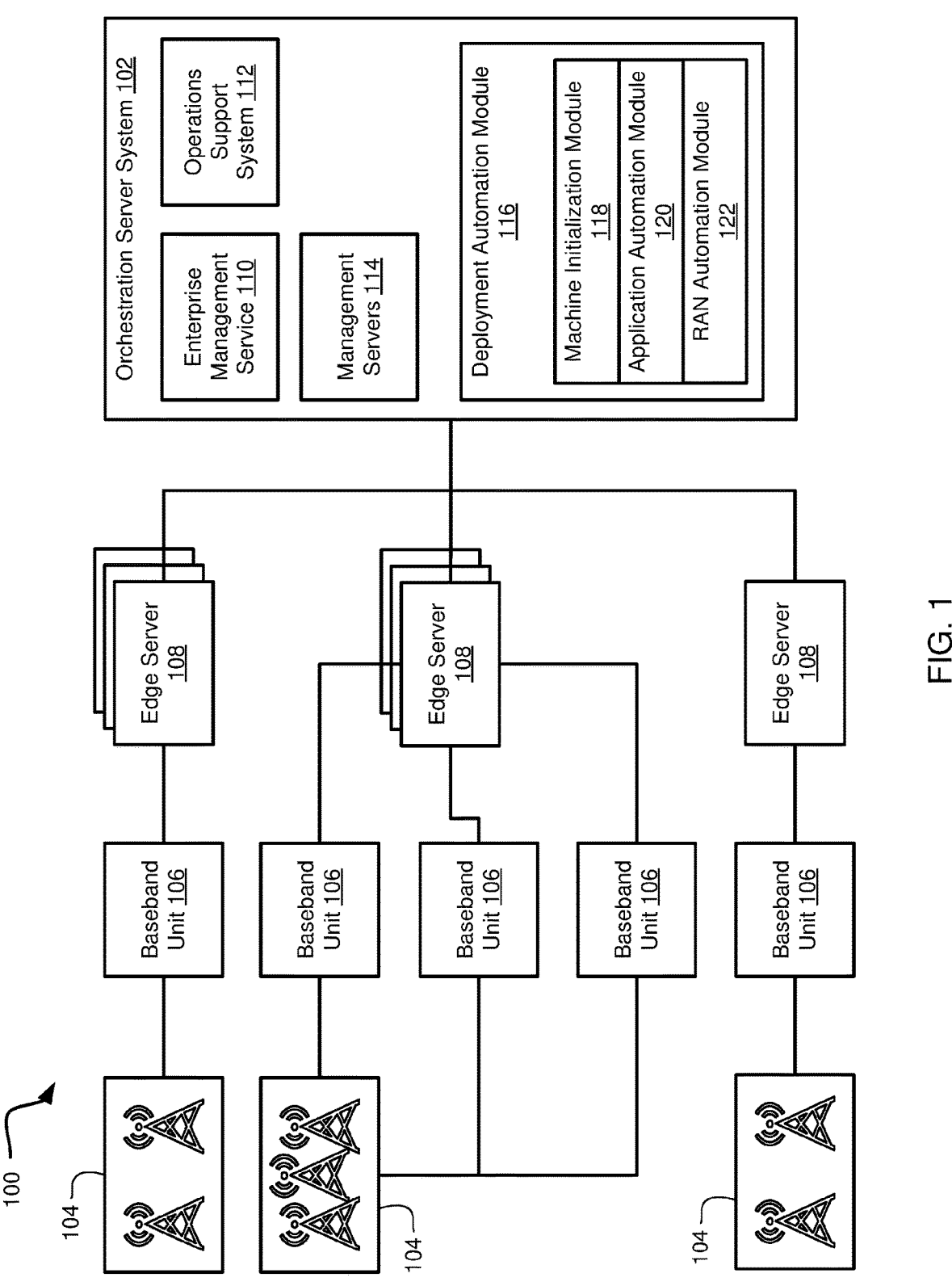
FIG. 1 is a schematic illustration of a network environment in which the systems and methods described herein may be used.

Referring now to the figures, FIG. 1 is a schematic illustration of a network environment 100 in which the systems and methods disclosed herein may be used. The network environment 100 includes a plurality of baseboard units (BBUs) 106 and edge servers 108 in communication with various antennas 104. The edge servers 108 comprise processing and memory resources configured to execute an orchestration server system 102. The orchestration server system 102 includes an enterprise management service 110, operations support system 112, management server 114, and a deployment automation module 116.

The antennas 104 are coupled to the baseband units 106. The baseboard units 106 provide translation between radio frequency signals received from the antennas 104 and digital data received from the edge servers 108. Each baseboard unit 106 may perform this translation according to applicable cellular wireless data protocols. The edge servers 108 are coupled to the orchestration server system 102 either directly or by way of one or more intermediary servers.

The orchestration server system 102 executes centralized management services used to manage the edge servers 108 and baseboard units 106. Specifically, the orchestration server system 102 executes enterprise management services 110, operations support systems (OSS) 112, and one or more management servers 114 for services implemented on the edge servers 108. The orchestration server system 102 executes a deployment automation module 116 that facilitates deployment of the baseboard units 106, the edge servers 108, and the services executing on the baseboard units 106 and the edge servers 108.

The deployment automation module 116 includes a machine initialization module 118 that detects and initializes hardware within the network environment 100. The hardware may include computing and storage devices for implementing the baseboard units 106 or the edge servers 108. For example, given a computing device configured with an IP address, the machine initialization module 118 may initialize the BIOS (basic input output system), install an operating system, configure the operating system to connect to a network and to the orchestration server system 102, and install an agent for facilitating installation of services and for performing management functions on the computing device at the instruction of the deployment automation module 116. For example, the machine initialization module 118 may use COBBLER in order to initialize the computing device.

The machine initialization module 118 may also discover computing devices on a network and generate a topology of the devices, such as in the form of a directed acyclic graph (DAG). The deployment automation module 116 may then use this DAG to select computing devices for implementing network services and in order to configure a machine to receive installation of a network service.

The deployment automation module 116 may include an application automation module 120 that automates the deployment of an application, such as a container executing an application on a computing device. The application automation module 120 may implement methods and systems described below relating to the automated deployment and management of applications.

One example application of the systems and methods disclosed herein is a radio area network (RAN) automation module 122 that performs the automated deployment of a network service in the illustrated network environment, including instantiating, configuring, and managing services executing on the baseboard units 106, the edge servers 108, and the orchestration server system 102 in order to implement a RAN in a one-click automated fashion.

Figure 2:
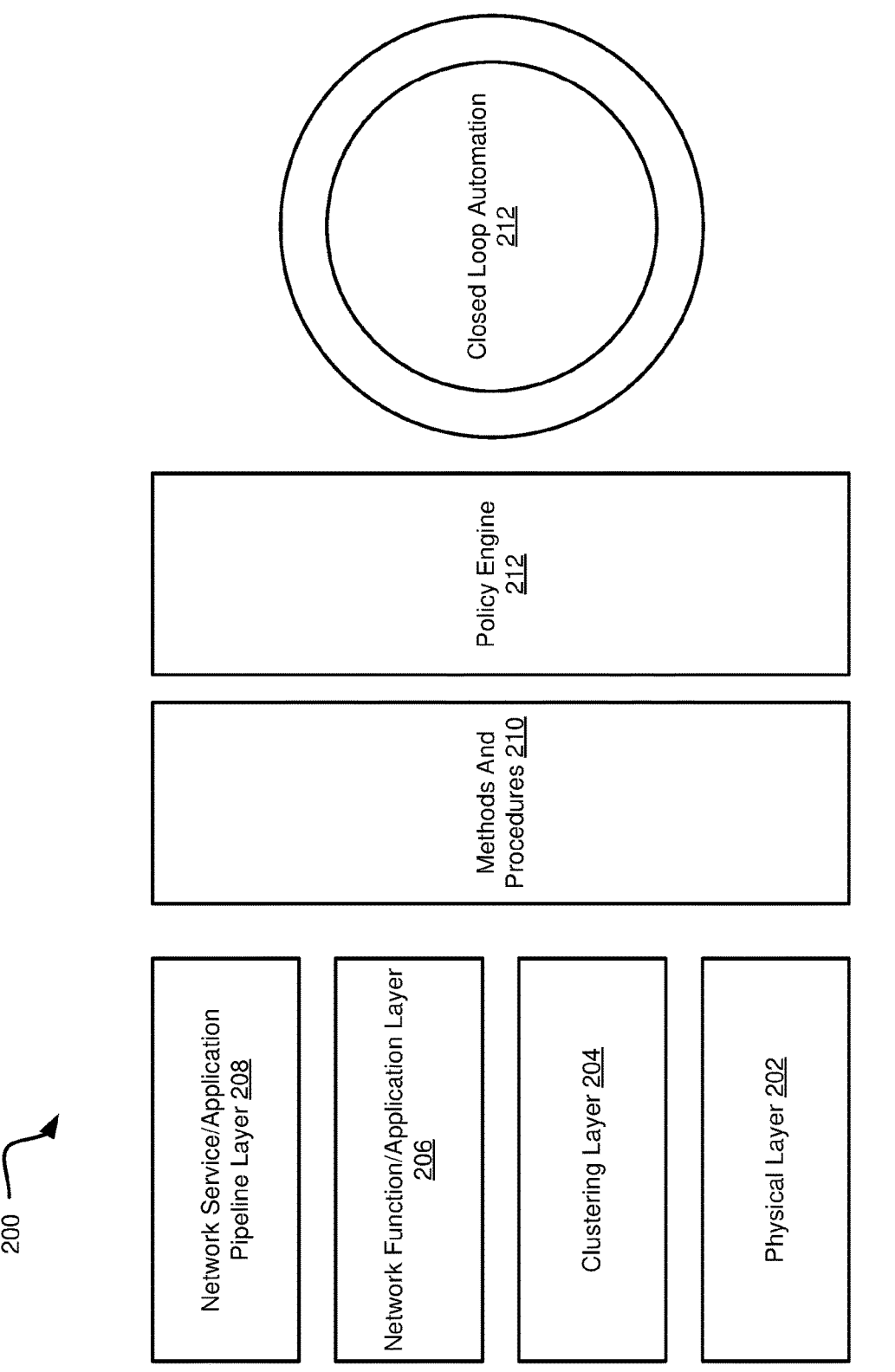
FIG. 2 is a schematic block diagram of a system comprising layers for external management of a network service.

FIG. 2 is a schematic block diagram of a system 200 comprising layers for external management of a network service. The system 200 includes a physical layer 202, clustering layer 204, network function/application layer 206, and a network service/application pipeline layer 208.

The physical layer 202 includes computing hardware and may further include basic software such as BIOS, firmware, an operating system, or even a virtual machine executing on the computing hardware. The system includes the clustering layer 204 residing on the physical layer 202. The clustering layer 204 includes data structures and software that enables a group of computing devices to act as a cluster. A cluster may be defined as a group of devices that are backups of one another, that provide a service with requests for that service being distributed among devices of the cluster according to a load balancing approach, that together implement a plurality of distinct applications that cooperate with one another to implement a service, or that are associated to one another for a common purpose or according to an arbitrary cluster definition of an administrator. The clustering layer 204 may be implemented by agent software executing on the physical layer 202 that coordinates with the deployment automation module 116 and other devices of a cluster.

The network function/application layer 206 includes applications executing on the computing devices of a cluster that individually or together with other applications executing on other nodes of the cluster implement a network service, such as access to a database, web server, or other server-based computational function that may be provided as a service to a user or another service of a network environment 100. The network service/application pipeline layer 208 may include a pipeline of network functions/applications 206 that communicate with one another to implement a more complex network service.

The operations of the layers 202-208 is managed by method and procedures (MOPs) 210 that are independent of the services implemented by the layers and include management functions such as instantiating, upgrading, health checks, monitoring power, restarting, replacing, scaling, and shutting down of the entities implementing a layer 202-208 (also referred to as life cycle management (LCM)).

The system 200 includes a policy engine 212 configured to provide logic that defines actions performed by any of the layers 202-208. These actions include, for example, procedures for implementing backups, procedures for handling faults at a particular layer, procedures for prioritization of individual MOPs 210, or other policies that an administrator may wish to impose on the operation of any of the layers 202-208.

For example, the policy engine 212 may have access to a topology of an application pipeline created according to the methods disclosed herein. Once a fault is identified, the policy engine 212 may implement an appropriate recovery policy. For example, if a computing device fails, its IP address may be released and assigned to a new computing device. The elements on the failed computing device may be instantiated on a new computing device assigned the IP address. If an element fails, a new element of the same type may be instantiated and configured to take its place. If a pod fails, a new pod may be created and configured to take its place.

The system 200 includes closed loop automation 214 that is executed in connection with any of the layers 202-208. The closed loop automation 214 may specifically include the performance of tasks, verification of performance of tasks, monitoring function, automated actions performed in response to states detected during monitoring, and other actions in order to implement some or all of the layers 202-208 and maintain operation of the layers 202-208.

Figure 3:
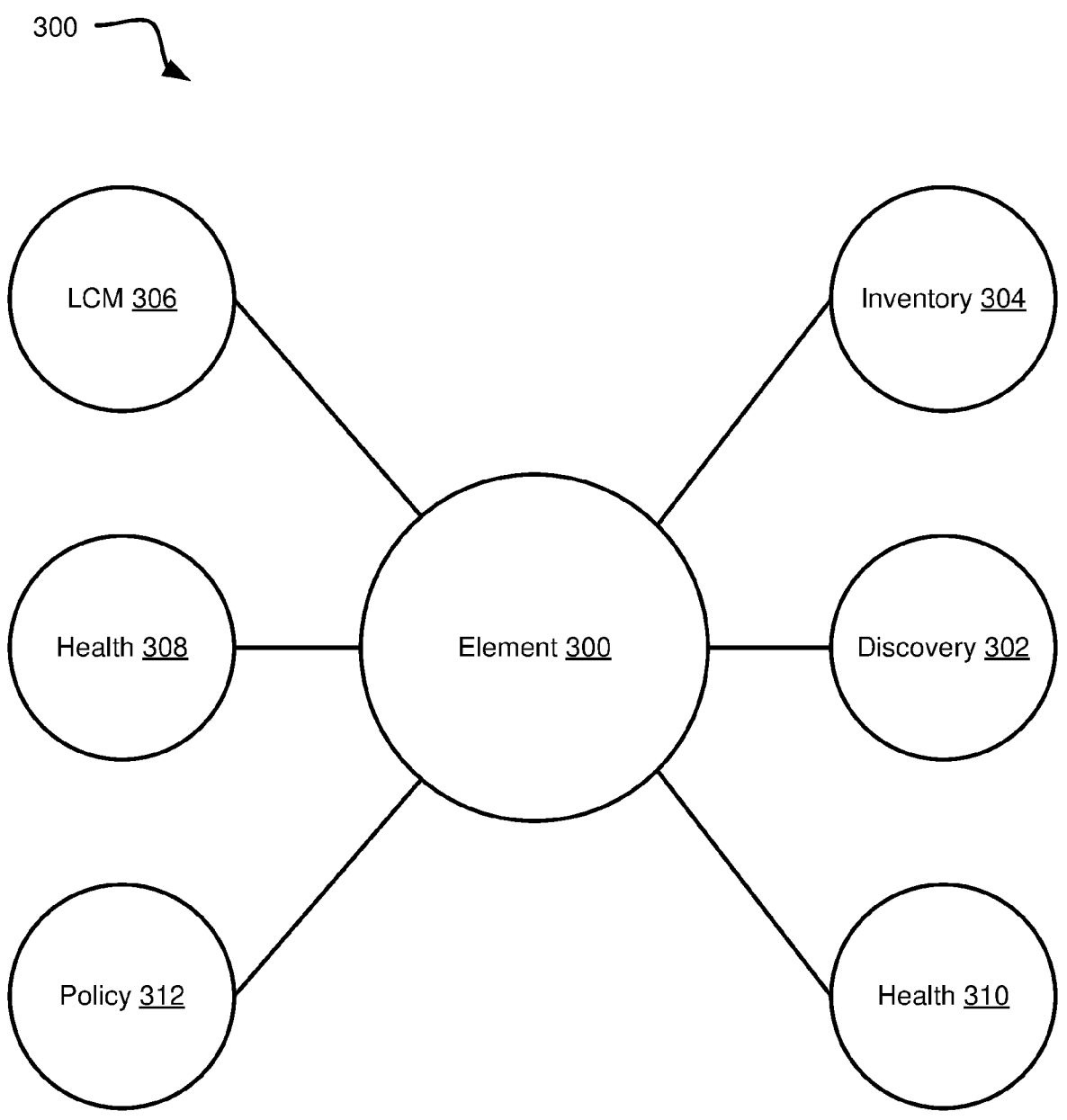
FIG. 3 is a schematic diagram of an element of a network service.

FIG. 3 is a schematic diagram of an element 300 of a network service in accordance with an embodiment of the present invention. Each entity that constitutes one of the layers 202-208 may be embodied as an element 300. Each element 300 defines functions and interfaces used by the deployment automation module 116 to deploy and manage an entity represented by an element 300. An element 300 may be an entity that is a combination of sub-elements and defines functions and interfaces for deploying and managing the combination of sub-elements. Accordingly, the deployment automation module 116 may invoke these interfaces and functions in order to deploy and manage an element 300 without requiring any modification of the deployment automation module 116 to adapt to or have data describing the entity represented by the element 300.

For example, an element 300 may define functions and interfaces for discovering 302 the element 300 such that once the element 300 is connected by a network to the deployment automation module 116, the element 300 may be discovered and its identity, type, and other attributes may be provided to the deployment automation module 116.

The element 300 may define functions and interfaces for maintaining a reference to the element 300 in an inventory 304 of elements 300 maintained by the deployment automation module 116. This may include responding to queries from the deployment automation module 116 with responses indicating availability of the element 300, e.g., whether it is assigned and operational.

The element 300 may define functions and interfaces for performing life cycle management (LCM) 306 of the element 300. This may include functions and interfaces for instantiating, upgrading, scaling, restarting, restarting, or de-instantiating the element 300.

The element 300 may define functions and interfaces for performing healing 308 on the element 300. This may include functions and interfaces for detecting faults, recovering from faults, restoring non-functioning parts of the element 300, or other actions for restoring or maintaining function of the element 300.

The element 300 may define functions and interfaces for monitoring health 310 of the element 300. This may include functions and interfaces for running diagnostic checks, performance checks, or other evaluations of the state of operation of the element 300.

The element 300 may define functions and interfaces for implementing policy 312 with respect to the element 300. This may include functions and interfaces for receiving a policy 312 for the element 300 and evaluating the policy 312 with respect to a current state of operation of the element 300. The functions and interfaces may define the policies themselves or may be configured to receive and implement policies received from the deployment automation module 116.

Figure 4:
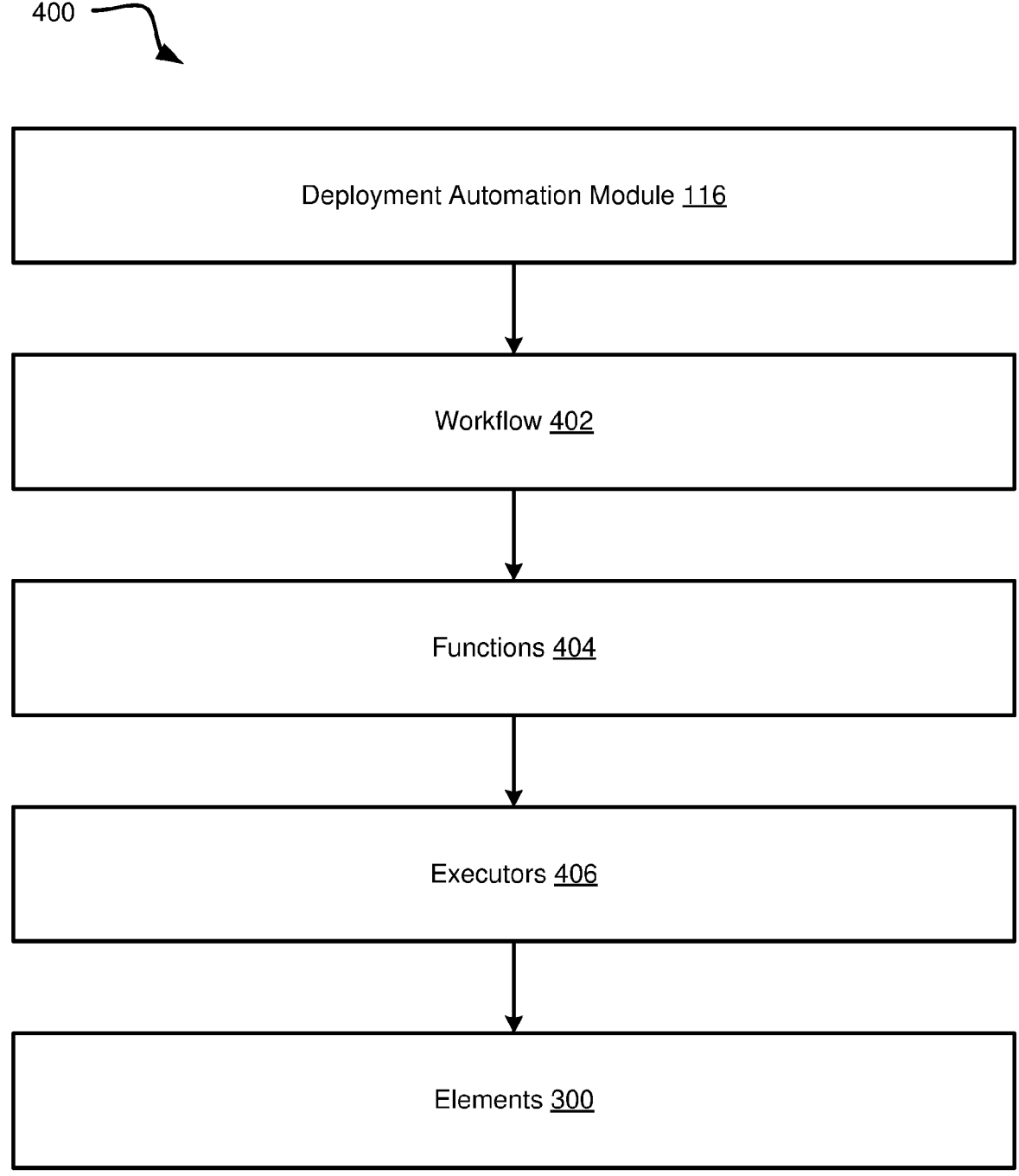
FIG. 4 is a schematic block diagram of a hierarchy for orchestrating a network service.

FIG. 4 is a schematic block diagram of a hierarchy 400 for orchestrating a network service in accordance with an embodiment of the present invention. The deployment automation module 116 may ingest a workflow 402. The workflow 402 defines a series of functions 404 and possibly an order of execution of the functions 404. The functions 404 may invoke executors 406 that operate with respect to an element 300. In particular, the functions 404 may be functions of instances of elements 300 included in the workflow 402. Accordingly, a workflow 402 may be define performance of functions 404 for specific elements 300 and possibly the ordering of these functions.

The elements 300 may be entities implementing a network service pipeline, radio area network (RAN), or any complex multi-application deployment and the workflow invokes the functions of these elements 300. As noted above, due to the abstraction of the elements 300, the workflow does not need to specify entity-specific functions. Instead, tasks of a workflow 402 including discovery, inventory management, life cycle management, health monitoring, healing, policy implementation and other high-level functions may be invoked by invoking corresponding interfaces and functions 302-312 of the elements 300 of the workflow 402.

Figure 5:
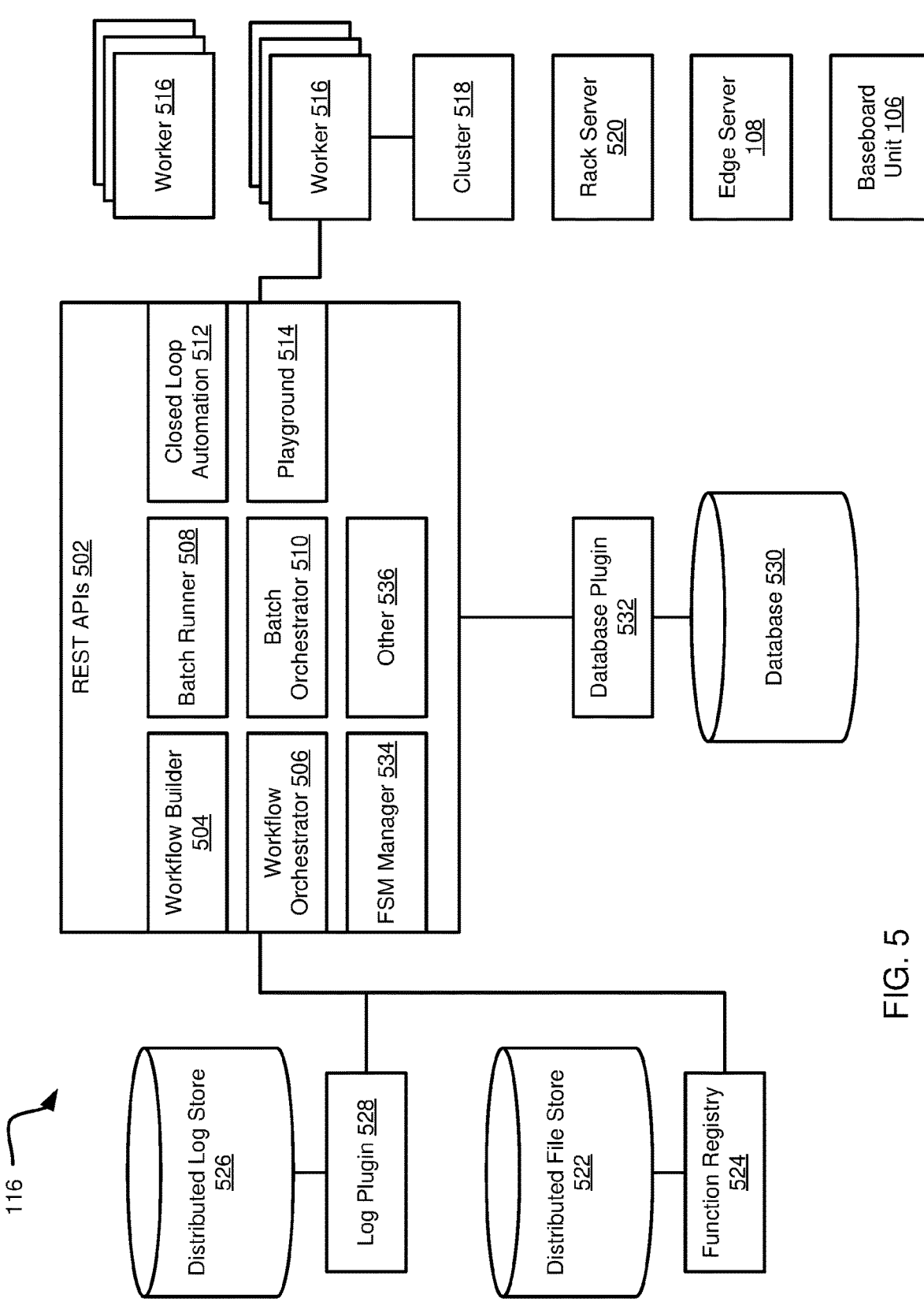
FIG. 5 is a schematic block diagram of a system for executing a deployment automation module of an orchestration server system.

FIG. 5 is a schematic block diagram of a system for executing the deployment automation module 116. The deployment automation module 116 includes a distributed log store 526, a distributed file store 522, and a database 530 in communication with a representation state transfer (REST) application program interface (API) 502. The REST API 502 includes components and software for executing a workflow builder 504, batch runner 508, closed loop automation 512, workflow orchestrator 506, batch orchestrator 510, playground 514, FSM manager 534, and other 536 functionalities.

The workflow builder 504 defines an interface enabling a user to create, select, and modify workflows 402. The workflow orchestrator 506 implements the functions 404 of a workflow 402 on the elements 300 of a workflow 402. In many instances, the number of elements 300 and the functions 404 that are performed with respect to elements 300 is very large, on the order of 1000s or even millions. Accordingly, the batch runner 508 sets up batch processing of functions 404 for elements 300 and a batch orchestrator 510 then executes the functions 404 in batches as defined.

The REST APIs 502 define closed loop automation 512 APIs that implement closed loop automation 214 of the deployment and management of the elements 300 of a workflow 402 according to the interfaces of the elements 300. The playground 514 provides a testbed for the creation and evaluation of elements 300, workflows 402, and functions 404.

The functions 404 of the workflows 402, either individually or as parts of batches, may be implemented by workers 516. The workers 516 may be embodied as pods, such as pods according to the KUBERNETES orchestration platform. Alternatively, workers 516 may be processes or threads of execution executing on one or more computing devices of a network environment 100. For example, the workers 516 may execute on clusters 518, a rack server 520, edge server 108, baseboard unit 106, or some other computing device.

The number of files required to define the functions 404 and elements 300 of a workflow 402 may be very large. Accordingly, a distributed file store 522 may be implemented, such as in the form of a database accessed by means of a function registry 524 that maps a function 404 of an element 300 (e.g., a function identifier associated with an element identifier) to a storage location in the distributed file store 522.

In a like manner, the number of files and amount of data generated by the functions 404 and applications instantiated by a workflow 402 may be very large. Accordingly, a distributed log store 526 may be implemented as a distributed database of log store to which functions 404 and applications instantiated by a workflow 402 may write updates too, such as by means of a log plugin 528.

Other data used by the REST APIs 502 may be stored in a database 530 accessed by means of a database plugin 532. For example, interfaces, templates, pre-defined workflows 402, elements 300, and other data that may be used by a user to define a workflow 404.

In some embodiments, each element 300 may have a state and a corresponding finite state machine that defines transitions between states of the finite state machine in response to events occurring involving the element 300. Accordingly, the REST APIs 502 may include a finite state machine (FSM) manager 534 for managing the state machine of each instance of any of the elements 300.

Other REST APIs 502 may implement other functions, such as observability of elements (OBF), rule-based access control, cluster federation, and other functions that may facilitate implementation and management of a network service pipeline.

Figure 6:
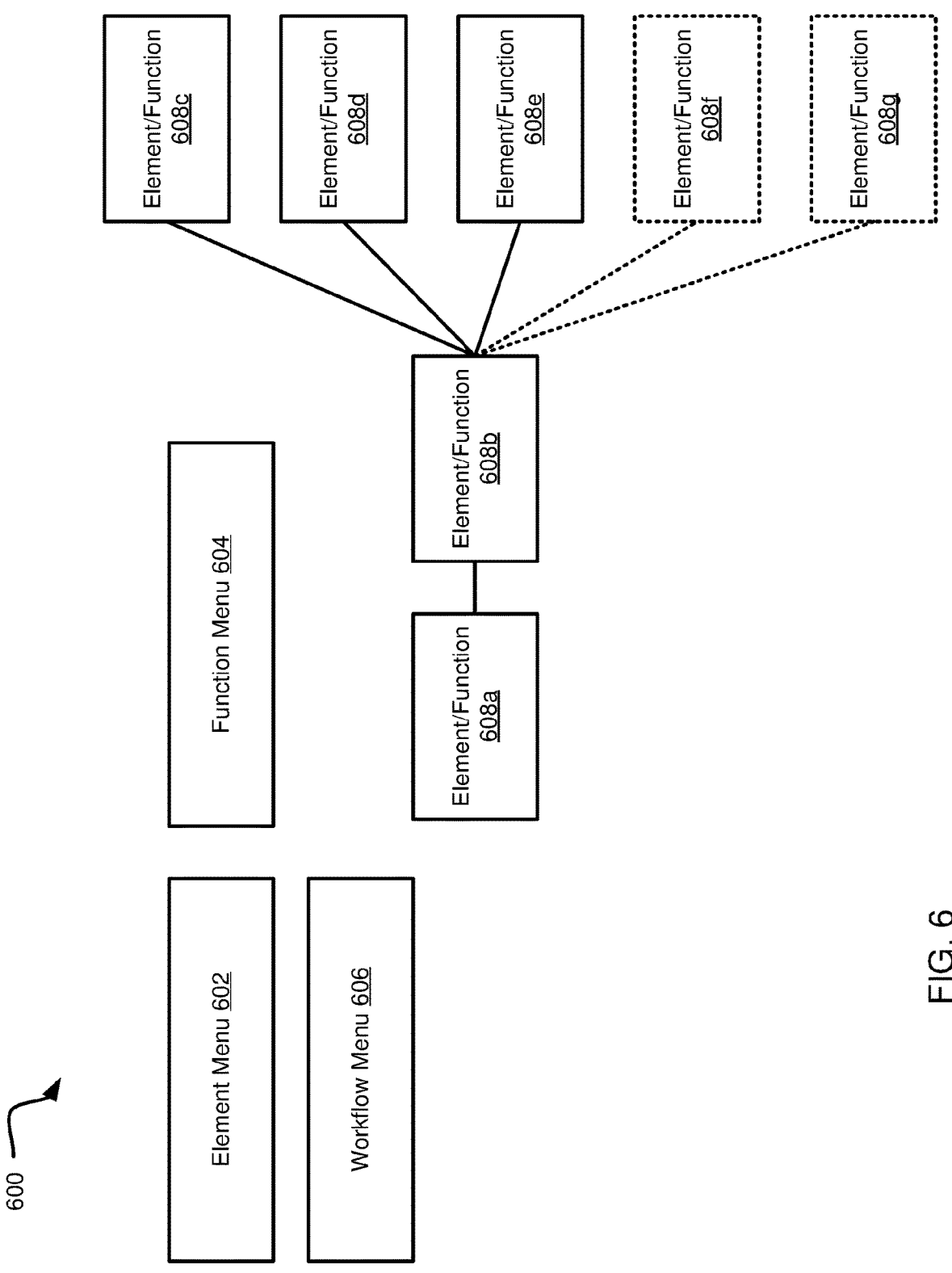
FIG. 6 is a schematic block diagram of an interface that may be provided by a workflow builder to facilitate creating workflows.

FIG. 6 is a schematic block diagram of an interface 600 that may be provided by the workflow builder 504 to facilitate creating workflows 402 in accordance with an embodiment of the present invention. The interface 600 may include an element menu 602 that enables a user to input a selection of an element 300 from a list of available elements 300. Elements 300 may include a virtual machine, a container, a database (e.g., MONGODB), an application, a router, a switch, a rack switch, relay, or any other element that may be needed to implement a network service. The interface may further include a function menu 604 that enables a user to input a selection of an element 300, e.g., the element selected using the element menu 602. This may include any of the interfaces and functions described above. For example, where a workflow 402 is to be created that instantiates a network pipeline, the functions selected from the function menu 604 may be functions to instantiate the selected element. For example, an element/function (i.e., a selected function for a selected element type) 608a may define instantiating a primary manager of a cluster, element/function 6086 may define instantiating a secondary manager of the cluster, element/functions 608c-608e may define instantiating one or more other nodes of the cluster. Other functions for a cluster may include acquiring licenses for software, performing network configuration of the managers and nodes of the cluster, acquiring IP addresses for the cluster and nodes of the cluster, setting up bundles (e.g., bundled applications), and setting up external backup depositories.

Each element/function 608-608e input by a user may be represented by an icon on the graphical user interface (GUI) 600, such as shown in FIG. 6. Each element function 608a-608e may have configuration parameters such as internet protocol (IP) address, identifier, number of processing cores, amount of memory, amount of storage, etc., to be allocated to the node instantiated by the function 6080-608e. These parameters may be specified by default or may be input by a user, such as by accessing a menu permitting their input by clicking on a representation of a function 608a-608e in the interface 600.

In some embodiments, predefined workflows 402 may be selected from a workflow menu 606. A user may then modify the workflow 402. For example, a workflow selected from the workflow menu 606 or created by a user may be modified to include additional element/functions 608f, 608g.

Figure 7:
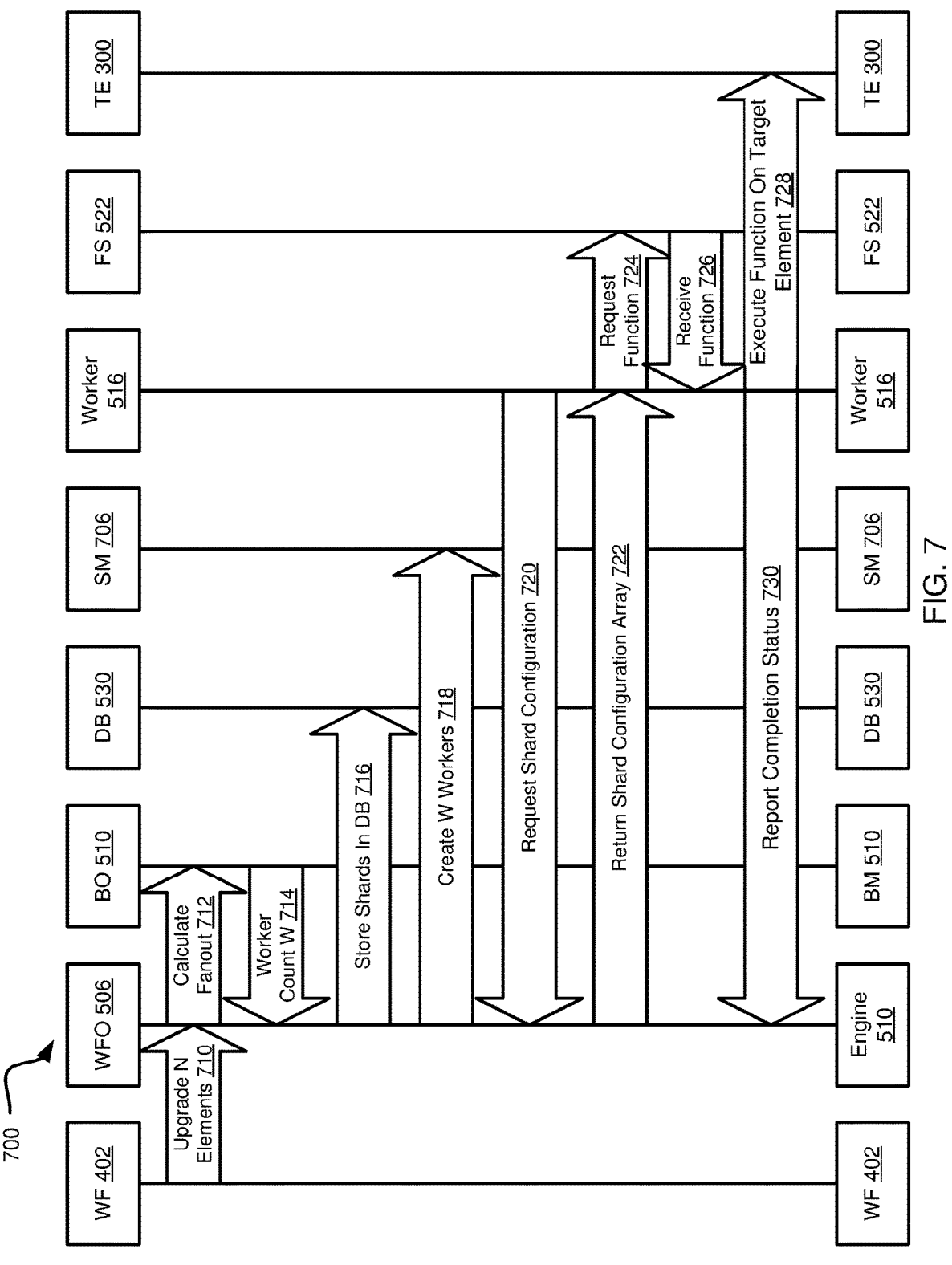
FIG. 7 is a process flow diagram of a method for batch processing functions for large numbers of elements.

FIG. 7 is a process flow diagram of a method 700 for batch processing functions for large numbers of elements in accordance with an embodiment of the present invention. The method 700 may be performed by the deployment automation module (DAM) 116, such as using the workflow orchestrator (WFO) 506 and batch orchestrator (BO) 510. Various other entities are involved in the method 700, including a workflow (WF) 402, the database (DB) 530, a spawning manager (SM) 706, workers 516, distributed file stores (FS) 522, and a plurality of target elements (TE) 300.

The method 700 includes receiving at 710 an instruction to perform a function with respect to N elements 300. In the illustrated example, this function is upgrading, though any function ascribed herein to an element 300 may also be performed. In a typical application, Nis very large, on the order of 1000s, 10,000s, or millions. The instruction received at 710 may be received from a user or received as part of processing a workflow 402.

The workflow orchestrator 506 receives the instruction at 710 and, in response, may calculate at 712 the fanout. This may include determining how many of the target elements 300 will be processed according to the function by a worker 516. The fanout may be static for all types of elements 300, defined for a particular type of element 300, defined for a particular function 302-312, defined for a particular function 302-312 of a particular type of element 300, or be determined based on some other criteria, which may be dynamic, such as a function of the value of N or current loading of workers 516 of the deployment automation module 116.

The batch orchestrator 510 may return at 714 a worker count W that is a number of workers 516 that are available to perform the function with respect to the N target elements 300. The workflow orchestrator 506 may then divide the N target elements 300 into shards such that each shard has approximately (e.g., +/−10) N/W elements 300 assigned to it. Each shard may include element identifiers of the target elements 300 assigned to it and may itself be assigned a shard identifier. The shards may be stored at 716, such as in the database 530.

The workflow orchestrator 506 may then invoke at 718 the creation of W workers. For example, a spawning module 706 may be programmed to generate workers 516 in response to receiving the instruction from step 718. Upon instantiation, the workers may each request 720 a shard from the workflow orchestrator 506, which may then return at 722 a shard configuration array, e.g., an array of target element identifiers along with an identifier of the function to be performed with respect to the target elements 300 referenced by the target element identifiers.

The worker 516 may then request at 724 the function, e.g., a script or executable, corresponding to the function identifier received at step 722, from the distributed file store 522. The worker 516 then receives at 726 the function and executes at 728 the function on each of the target elements 300 reference in the shard configuration array received at step 722. Upon completion of execution of the function with respect to each target element 300 referenced by the shard, the worker 516 reports 730 completion to the workflow orchestrator 506. When all workers 516 complete processing of their shards, the instruction received at step 702 may be complete.

Figure 8:
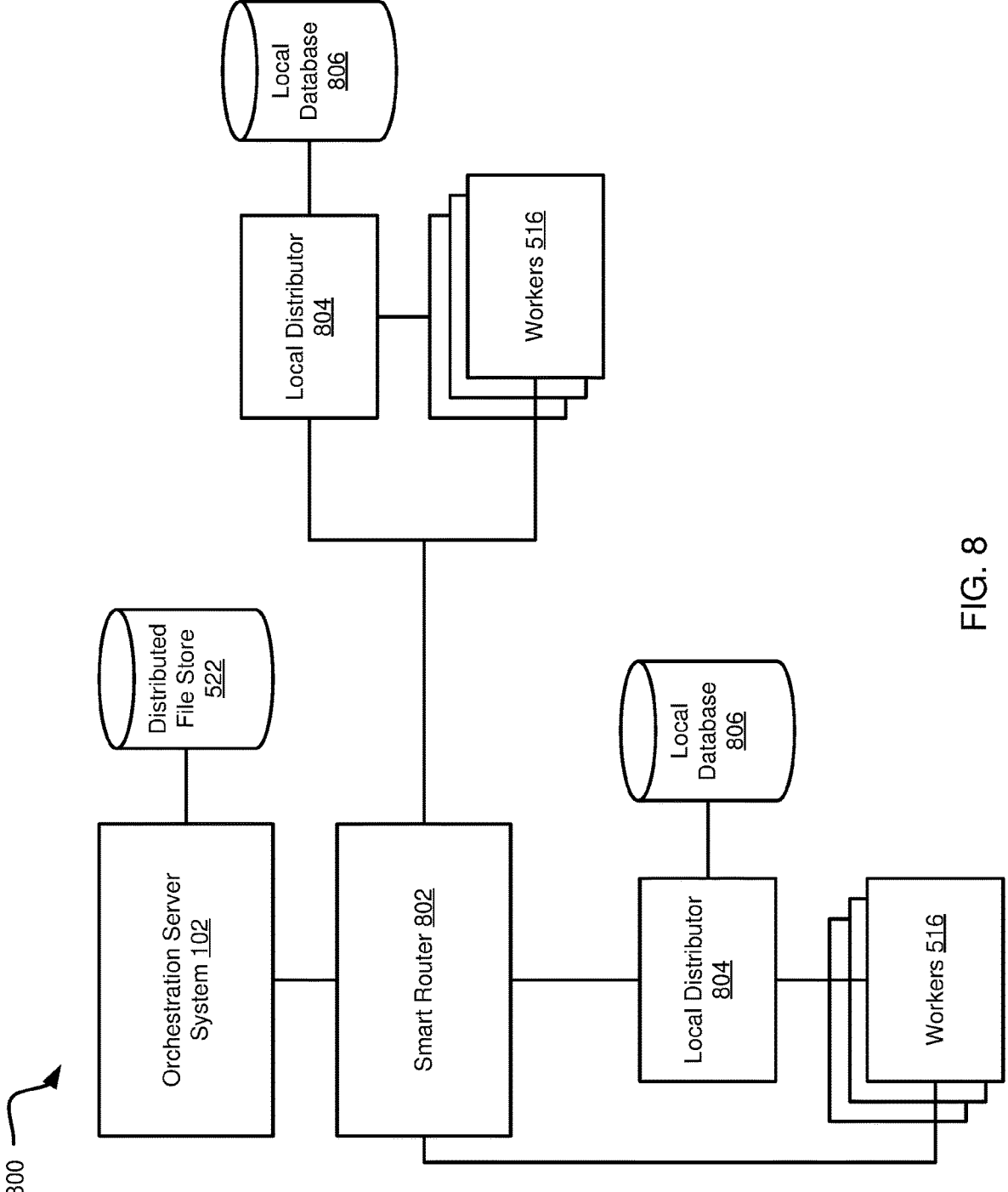
FIG. 8 is a schematic block diagram of a system for distributing files and executing functions of a workflow.

FIG. 8 is a schematic block diagram of a system 800 for distributing files and executing functions of a workflow. The system 800 includes a smart router 802 coupled to various local distributors 804. The local distributors 804 may be embodied as applications executing within pods, e.g., KUBERNETES pods, executing throughout a network environment 100. The distributors 804 may host or access a local database 806. The local database 806 may be a copy of the distributed file store 522 or a portion thereof. For example, given the elements instances in proximity to the local distributor 804, the portion of the distributed file store 522 may include data from the distributed file store 522 relating to those elements, e.g., executables and data for performing the functions of those element instances. Proximity to the local distributor 804 may mean located in the same subnetwork or having a network connection to the local distributor 804 having latency below a threshold.

The workers 516 may request data from the distributed file store 522. These requests may be received by the smart routers 802, which identifies the local distributor 804 that is either having the lowest network latency connection to the requesting worker 516 or is more available (i.e., lower latency due to lower loading) to distribute files than the local distributor 804 with lowest network latency. For example, the smart router 802 may include a load balancer 804 as described above with respect to FIG. 8 such that the local distributor 804 is selected according to network latency and loading as described above. The request is then routed by the smart router 802 to the selected local distributor 804, which then provides the requested data to the worker 516 that generated the request.

Figure 9:
FIG. 9 is a schematic block diagram of a system that may be used to implement the functionality of a machine initialization module of an orchestration server system.

FIG. 9 illustrates a system 900 that may be used to implement the functionality of the machine initialization module 118. The machine initialization module 118 may operate with respect to bare metal servers 902 that are "bare metal," i.e., have no operating system, kernel, or other software installed thereon other than firmware stored in non-volatile RAM on the device. This firmware will include a basic input output system (BIOS) as well as firmware on components of the bare metal server 902 such as a network adapter (e.g., network interface card (NIC)), hard disk drive (HDD), solid state drive (SSD), redundant array of independent disks (RAID), just a bunch of disks (JBOD), field programmable gate array (FPGA), baseboard management controller (BMC), Non-Volatile Memory Express (NVME) controller, or other component of the bare metal server 902. Although the foregoing description refers to a bare metal server 902, any computing device, such as a router, switch, endpoint (personal workstation, mobile computing device, internet of things (IoT) device, etc.), or any other computing device that may communicate over a network.

The machine initialization module 118 itself may be structured as an application that may execute on a node of a cluster 518. The machine initialization module 118 may operate on the same cluster 518 or a different cluster from a cluster hosting the workflow orchestrator 506 and one or more workers 516 implementing functions of a workflow being managed by the workflow orchestrator 506 according to the methods described herein.

The machine initialization module 118 accesses the distributed file store 522 to obtain images 904 of operating systems and other executables to be instantiated on a bare metal server 902. The distributed file store 522 may also store artifacts 906 that are likewise executables or other data that are used by the machine initialization module 118 to initialize a bare metal bare metal server 902.

Figure 10:
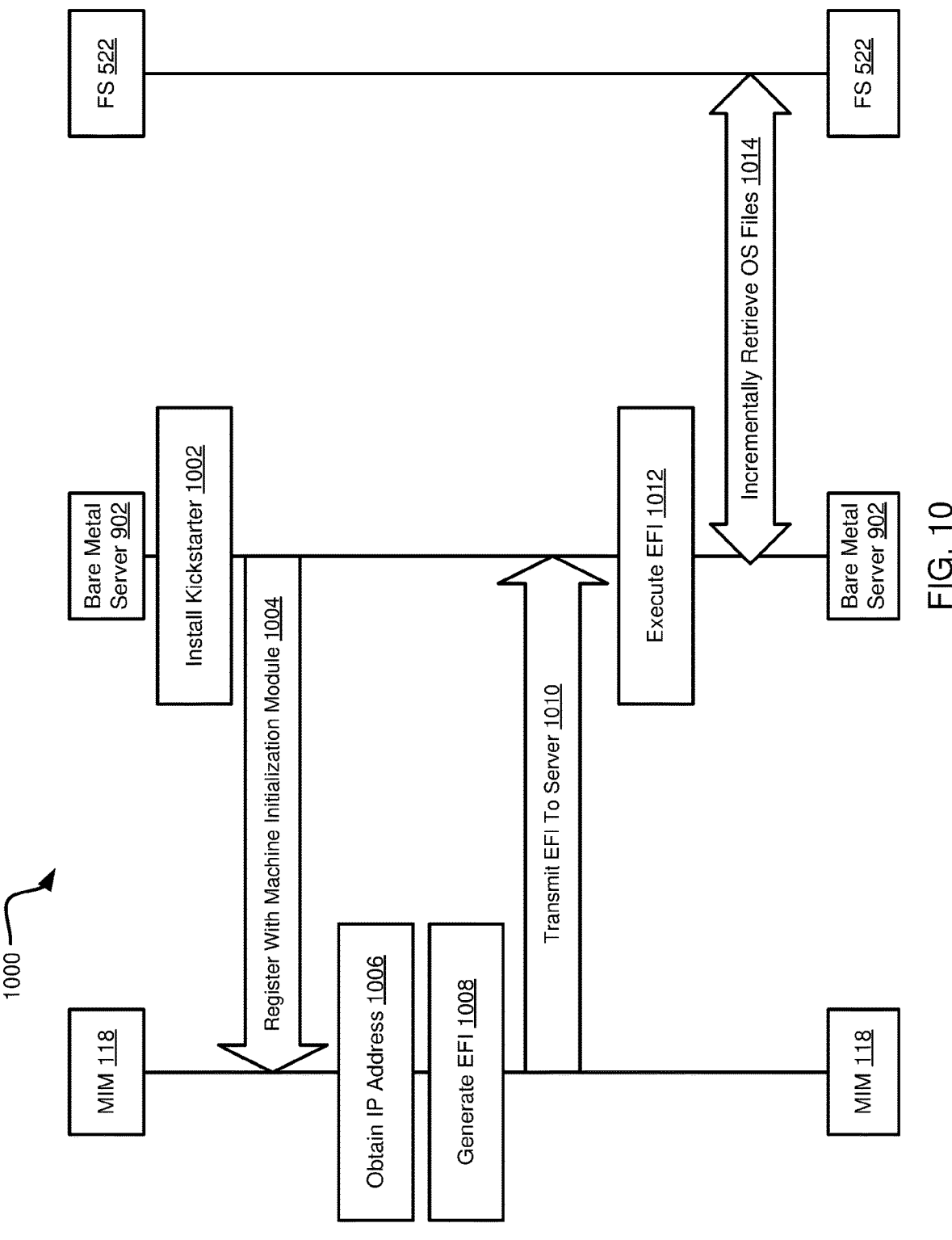
FIG. 10 is a schematic flow chart diagram of a method for initializing a bare metal server.

FIG. 10 illustrates a method 1000 for initializing a bare metal server 902. The method 1000 may begin with installing 1002 of a kickstarter executable on the bare metal server 902. The kickstarter may correspond to the configuration of the bare metal server 902. The configuration of the bare metal server 902 may be represented using a JAVASCRIPT Object Notation (JSON) file that describes the hardware, firmware, and/or software versions of the bare metal server 902. The JSON file may further include links to a kickstarter file that corresponds to the needs of an application to be installed on the server system 1302, that corresponds to the SKU of the bare metal server 902 or is configured based on some other criteria. For example, there may be a kickstarter associated with each SKU (stock keeping unit) defining a type of bare metal server 902. Accordingly, the kickstarter installed at step 1002 may be that which corresponds to the SKU of the bare metal server 902. The kickstarter may include a profile of the bare metal server 902, such as according to the Basic, EPA-1, EPA1-test, and/or EPA2 system profile types.

The kickstarter may include a configuration file that configures the bare metal server 902 to register with the machine initialization module 118. Since the bare metal server 902 is not configured with an operating system or an IP (internet protocol) address, the kickstarter may include computer instructions that instruct the bare metal server 902 to communicate with the machine initialization module (MIM) 118 using the baseboard management controller (BMC) IP address with which the bare metal server 902 was configured by a manufacturer. The kickstarter may include an IP address for the machine initialization module 118 or that of some other component that is programmed to route communications from a kickstarter to the machine initialization module 118. Alternatively, the request to register may be broadcast and detected by a component in a network environment that routes the request to the machine initialization module 118. Installing 1002 of the kickstarter may be performed manually by a human operator or by a component coupled to a network to which the bare metal server 902 is connected when installed in a rack, datacenter, or other facility.

The bare metal server 902 executes the kickstarter, which causes the bare metal server 902 to register 1004 with the machine initialization module 118 by communicating over the network to the IP address included in the kickstarter. Registering may include providing the BMC IP address of the bare metal server 902 to which the machine initialization module 118 may address subsequent communications.

The machine initialization module 118 may obtain 1006 an IP address ("the server IP address") to assign to the bare metal server 902 and generate 1008 an extensible firmware interface (EFI) image including the IP address. The IP address may be assigned at step 1006 according to a workflow 402. For example, if the bare metal server 902 is (or hosts) an element instance created according to a function 404 workflow 402, the parameters of the function 404 may include a statically or dynamically assigned IP address for the bare metal server 902. Alternatively, the IP address may be assigned according to an IP address management (IPAM) algorithm executed by the machine initialization module 118, workflow orchestrator 506, or another component in a network environment. In particular, the method 1000 may be executed independently from the workflow orchestration approaches described herein such that the IP address is obtained according to an IPAM algorithm according to any approach known in the art.

The machine initialization module 118 may generate 1008 an executable file including the IP address. In some embodiments, the executable file may be an extensible firmware interface (EFI) image. The executable file may be generated according to the workflow used to select the IP address. The executable file may further include network information such as an IP address for a network gateway to be used by the bare metal server 902, e.g., a node in a network domain including the IP address assigned to the bare metal server 902. The executable file may further contain instructions for configuring the bare metal server 902 to connect to a virtual local area network (VLAN).

In some embodiments, the EFI image may include executable code instructing the bare metal server 902 to retrieve and install an operating system kernel from a specified IP address. The EFI image itself may be configured as a bootstrap kernel from which the server system 1302 may boot itself up. The EFI image may include executable code instructing the bare metal server 902 to retrieve and execute firmware upgrade files for the BIOS, network adapter, HDD, SSD, BMC, BIOS, NIC, RAID, JBOD, NVME controller, FPGA, or other component of the bare metal server 902. Upgrading of firmware or other operations instructed by the EFI image may further include flashing custom images on any of these components or otherwise configuring these components, such as a RAID or JBOD. The EFI image may include executable code instructing the bare metal server 902 to retrieve operating system files for installing an operating system on the bare metal server 902. The EFI image may be formatted as an ISO (International Organization for Standardization) image that can be mounted as a disk to be booted up from on the bare metal server 902. The EFI image is preferably small, such as less than 3 MB. For example, an ISO file size of 2.12 MB has been found to be achievable.

In some embodiments, the EFI image may be obtained from a boot configuration file including the above-described instructions to configure the server IP address, network gateway, and retrieve and install the operating system kernel. The boot configuration file may further include instructions to connect to a virtual local area network (VLAN). The boot configuration file may be written in IPXE (an open-source implementation of the Preboot Execution Environment client firmware and bootloader) scripting language and using IPXE syntax. This IPXE scripting language may be compiled using IPXE source code to obtain a bootable EFI image that packs the information of the boot configuration file in a form that can be executed by an IPXE bootloader on the bare metal server 902 in either legacy BIOS or EFI mode.

The IPXE bootloader is typically a small kernel that includes drivers for the hardware of the bare metal server 902 and has the ability to configure new hardware of different types including networking, storage, and the like. In the illustrated embodiment, the ability of the IPXE bootloader to configure a network interface is used to configure the server IP address and network gateway of the bare metal server 902 and may also be used to configure the bare metal server 902 to connect to a VLAN.

The EFI image may be converted into a bootable ISO file. The BMC of the bare metal server 902 may be capable of mounting an ISO file either through an API (application programming interface) call or manual intervention. In some embodiments, a boot order on the bare metal server 902 may be modified such that the bare metal server 902 boots from the bootable ISO file including the EFI image. For example, the kickstarter may be programmed to modify the boot order in this manner.

The bootable ISO file may include both the EFI image and a bootloader, such as the "isolinux.bin" bootloader. The bootloader may contain the encoded form of the configuration file that will be executed on the server during the boot load process where the bootloader successively attempts to configure each interface according to the EFI image (including the network interface as described above) and tries to retrieve the operating system kernel according to instructions in the EFI image. Once the bootloader successfully retrieves the operating system kernel, it uses this interface to install the rest of the OS, as described below with respect to FIG. 15.

The bootloader, such as isolinux.bin, may be added to the ISO file including the EFI image to perform bootloading of the hardware of the bare metal server 902. The EFI image (e.g., an ipexe.efi file) interacts with the EFI BIOS to do an initial boot, recognize EFI capabilities, and present the EFI capabilities to the kernel for a Stage 2 booting of the kernel in EFI mode. This EFI image may be placed in the distributed file store 522 where it is accessible via an HTTP (hypertext transport protocol) server (or an HTTP secure (HTTPS) server).

The machine initialization module 118 transmits 1010 the EFI image (e.g., ISO file including the EFI image) to the bare metal server 902. The bare metal server 902 receives the EFI image and executes 1012 it. This may include mounting the ISO image and executing the bootloader in the ISO image. The bootloader processes the EFI image to configure the network interface of the bare metal server 902 and retrieve and install an operating system kernel as described above. In some embodiments, the EFI image may be executed by a VMCLI (virtual machine command line interface) utility on the bare metal server 902.

As a result of executing the EFI, the bare metal server 902 is configured with an IP address for itself, an IP address of a network gateway to be used by the bare metal server 902, an operating system kernel, and with instructions to download an operating system from a specified source IP address, such as that of the distributed file store 522. In some embodiments, the EFI image includes instructions causing the bootloader to incrementally retrieve 1014 the operating system. For example, instead of having to retrieve a 2 GB ISO file including an operating system image, the EFI image may include instructions to download smaller installation packages implementing installation of the operating system in order to reduce loading of the distributed file store 522.

Figure 11:
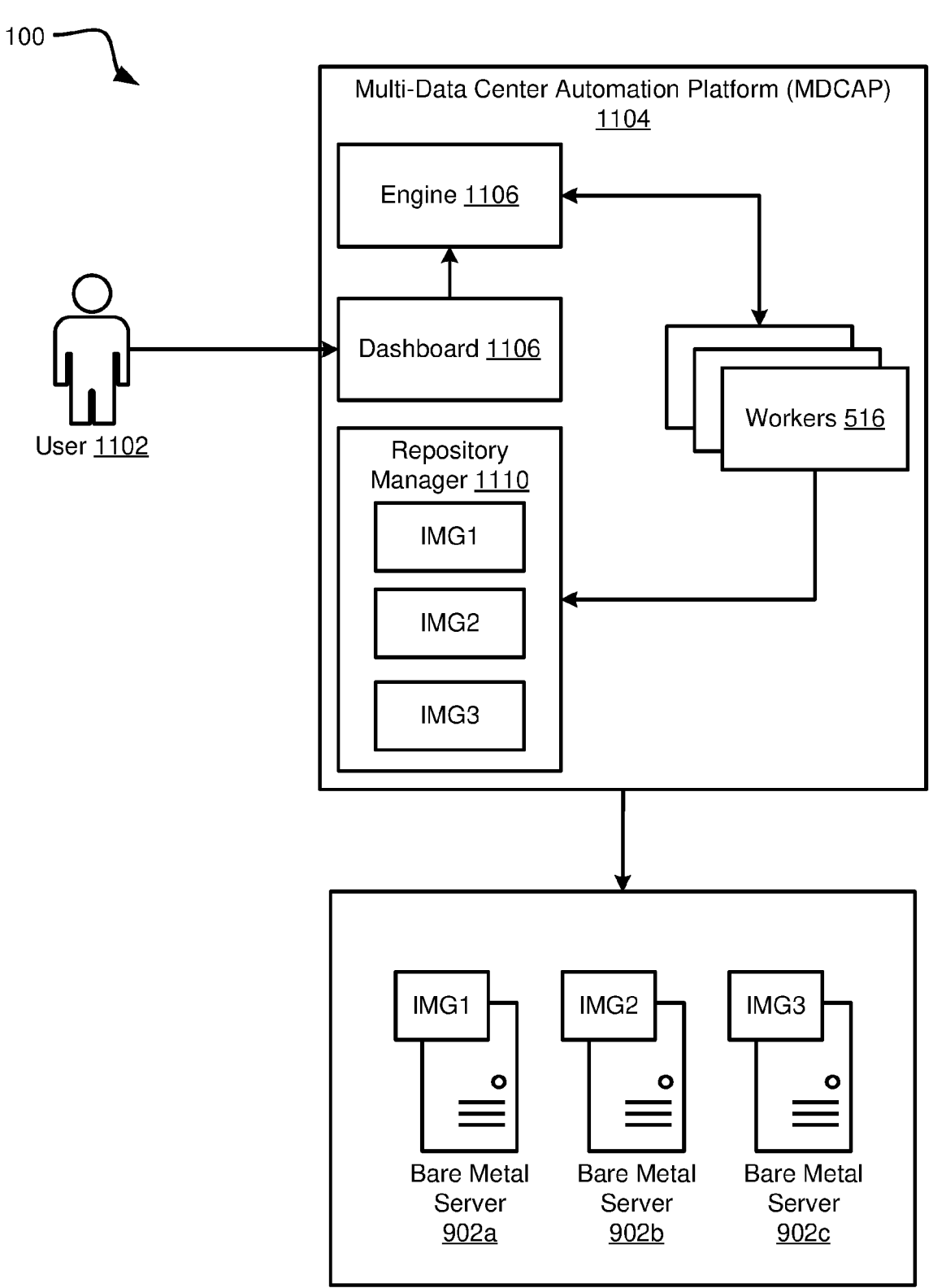
FIG. 11 is a schematic block diagram of a system for capturing a disk image of bare metal servers that may be used to install operating systems on other bare metal servers with a copy and paste functionality.

FIG. 11 is a schematic block diagram of a system 1100 for capturing a disk image of bare metal servers that can be used to install operating systems on other bare metal servers with a copy and paste functionality. The system 1100 includes a multi-data center automation platform (MDCAP) 1104 in communication with a user 1102. The MIDCAP 1104 includes an engine 1106 and a dashboard 1106. The MDCAP 1104 renders the dashboard on a user interface 1106 accessible by the user 1102. The MIDCAP 1104 includes or communicates with a plurality of workers 516. The MDCAP 1104 includes or accesses a repository manager 1110 that manages binary resources for the MIDCAP 1104.

The repository manager 1110 serves as a central hub for integrating with tools and processes to improve automation of the system 1100 and increase system 1100 integrity. In some implementations, the repository manager 1110 is implemented as an ARTIFACTORY. The repository manager 1110 organizes binary resources, including, for example, remote artifacts, proprietary libraries, third-party resources, and so forth. The repository manager 1100 pulls these resources into a single centralized location for a plurality of bare metal servers 902a-902c.

The repository manager 1100 manages and automates artifacts and binaries from start to finish during the application delivery process. The repository manager 1100 enables the option to select from different software build packages, major CI/CD (continuous integration/continuous development) systems, and other development tools. The repository manager 1100 may be implemented within a KUBERNETES containerized system with a DOCKER registry with full REST APIs 502 as discussed herein. The repository manager 1100 supports containers, Helm charts, and DOCKER.

Figure 12:
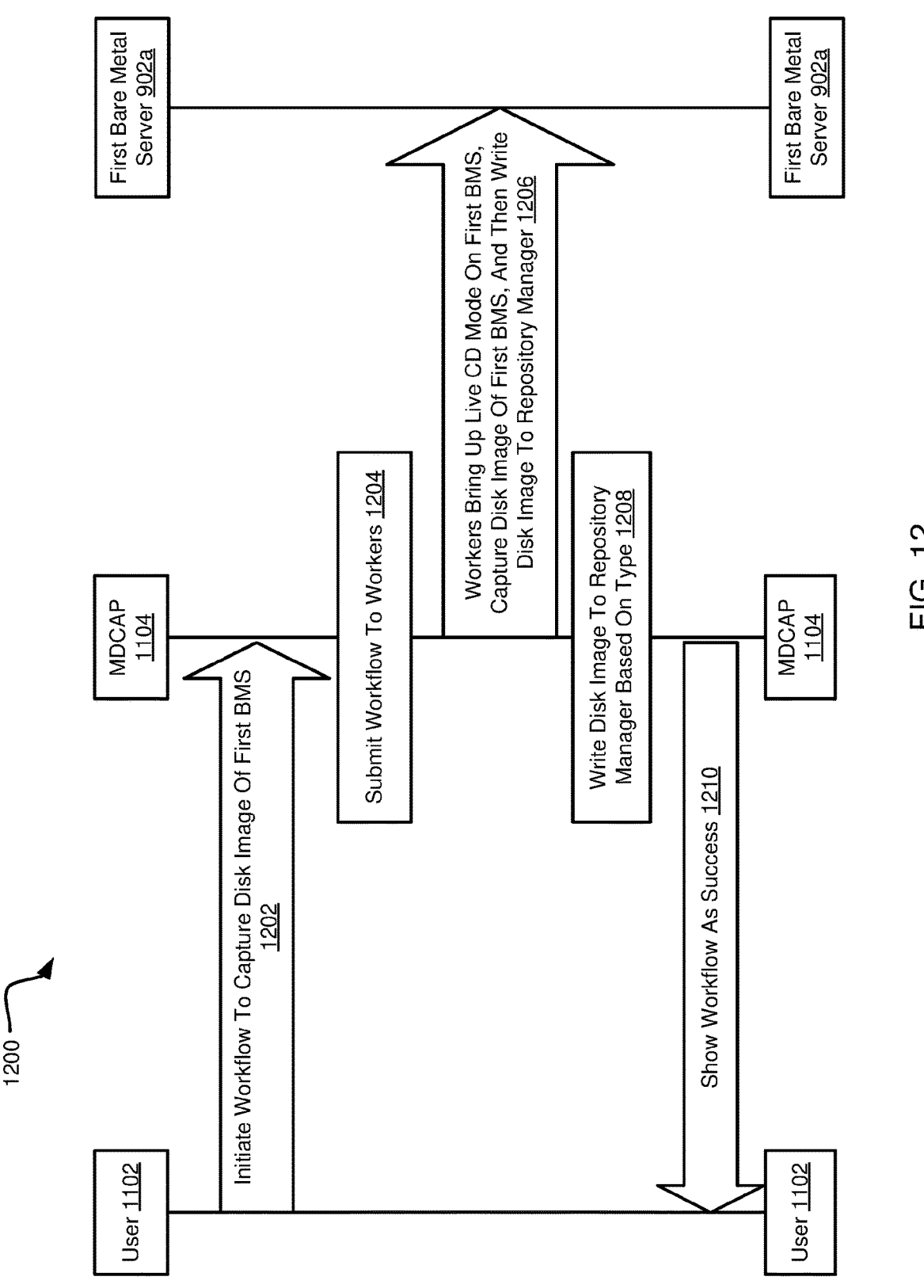
FIG. 12 is a schematic process flow diagram of a method for capturing a disk image of a first bare metal server.
Figure 13:
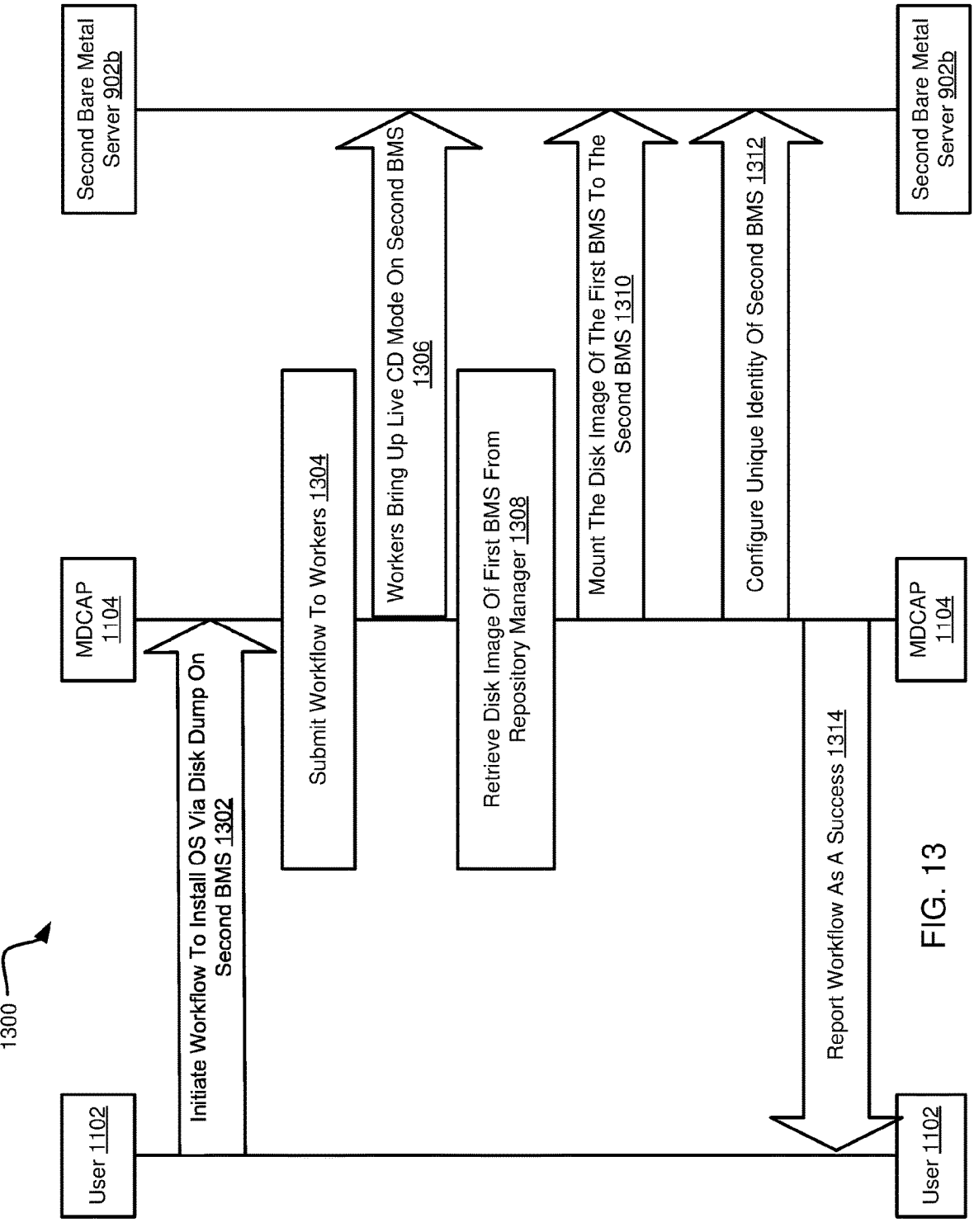
FIG. 13 is a schematic process flow diagram of a method for configuring a second bare metal server with a disk image of a first bare metal server.

FIGS. 12 and 13 are methods for capturing a disk image of a bare metal server, and then using the captured disk image to install an operating system on one or more other bare metal servers. The methods 1200, 1300 are similar to a copy/paste functionality to obtain high performance while keeping server reboots to a minimum. FIG. 12 is a schematic block diagram of a method 1200 for a "copy phase" wherein the disk image of a first bare metal server 902a is copied and stored. FIG. 13 is a schematic block diagram of a method 1300 for a "paste and configuration" phase wherein the previously copied disk image of the first bare metal server 902 is installed on a second bare metal server 902b. The methods 1200, 1300 are executed by a user 1102, the MDCAP 1104, and a plurality of bare metal servers 902.

The disk image consists of a computer file containing the contents and structure of a disk volume or an entire data storage device wherein the operating system is installed. The disk image is typically made by creating a sector-by-sector copy of the source medium, thereby perfectly replicating the structure and contents of the bare metal server 902 independent of the file system. Depending on the disk image format, the disk image may span one or more computer files. The file format for the disk image may include an open standard format, such as the ISO image format for optical disc images, or a disk image may be unique to a particular software application.

The method 1200 begins and the user 1102 initiates at 1202 a workflow to capture a disk image of a first bare metal server 902*a* (BMS). The user 1102 initiates the workflow by interacting with the dashboard 1106 of the MDCAP 1104 that is rendered on a user interface. In some cases, and irrespective of disk size, the disk image is directed only on the partition where the operating system is installed on the first server. The method 1200 continues and the MIDCAP 1104 submits the workflow to the workers 516 at 1204.

The method 1200 continues and the workers 516 of the MDCAP 1104 bring up a live CD (continuous development) mode on the first bare metal server 902*a*. In an implementation, the workers 516 do this through iPXE, which is an open-source implementation of the Preboot execution environment client software and bootloader. Thus, the workers 516 accomplish step 1206 without use of a DHCP (dynamic host configuration protocol) server as discussed herein (see, for example, the discussion in connection with FIG. 10). Step 1206 continues and the workers 516 capture a disk image of the first bare metal server 902*a*. The workers 516 then write the disk image to the repository manager 1110 of the MDCAP 1104. Upon being written to the repository manager 1110, the disk image is now accessible over a URL. The method 1200 continues and the MDCAP 1104 writes the disk image to the repository manager 1110 based on its type. The MDCAP 1104 then notifies the user 1102 that the workflow was a success.

The "copy phase" method 1200 continues on with the "past and configure" phase of the method 1300 illustrated in FIG. 13. The method 1300 begins and the user 1102 initiates a workflow at 1302 to install an operating system on the second bare metal server 902*b* by way of a disk image dump. The MDCAP 1104 receives the request from the user by way of the dashboard 1106 that is rendered on a user interface. The user 1102 may initiate a workflow to install the disk image of the first bare metal server 902*a* onto a plurality of other bare metal servers, including second bare metal server 902*b* identified in FIG. 13. The user 1102 may request that the disk image of the first bare metal server 902*a* be installed on a plurality of other bare metal servers simultaneously. The MIDCAP 1104 submits the workflow to the workers 516 at 1304.

The method 1300 continues and the workers 516 of the MIDCAP 1104 bring up a live CD (continuous development) mode on the second bare metal server 902*b* at 1306. The workers 516 may accomplish this through iPXE, without the use of a DHCP server, as discussed herein (see, for example, the discussion in connection with FIG. 10). The MDCAP 1104 retrieves the disk image of the first bare metal server 902*a* from the repository manager 1110 at 1308. The MDCAP 1104 may retrieve the disk image at 1308 by downloading the disk image from the repository manager through an available URL. While the data for the disk image is being downloaded, the disk image is written directly to a disk on the MDCAP 1104. The MDCAP 1104 writes the disk image in a pre-section of a kickstarter file.

The method 1300 continues and the MIDCAP 1104 then mounts the disk image of the first bare metal server 902*a* to the second bare metal server 902*b* at 1310. The MDCAP 1104 then configures the unique identity of the second bare metal server 902*b* at 1312. The configuration of the unique identity includes configuring, for example, the IP address, gateway, DNS (domain name system), and hostname for the second bare metal server 902*b*. The method 1300 continues and the MDCAP 1104 notifies the user 1102 that the workflow was a success at 1314.

The methods 1200, 1300 discussed in connection with FIGS. 12 and 13 are implemented to capture disk and partition dumps of an operating system, and then rewrite the operating system onto another bare metal server. The MDCAP 1104 provides a means to capture a disk image of a bare metal server 902 such that the captured disk image may be used to install an operating system on another bare metal server 902. The methods 1200, 1300 are similar to a copy/paste functionality and may be implemented to achieve high performance while keeping server reboots to a minimum.

The MIDCAP 1104 is leveraged to capture a disk image and partition dump of an operating system, and then rewrite the captured disk image to one or more other bare metal servers. The captured operating system may be written with specific changes, including alterations to identifying information such as the IP address, hostname, gateway, DNS, and so forth. This is particularly useful in complex DU far edge use cases when it is important to keep server reboots to a minimum.

The methods 1200, 1300 significantly reduce the time required to install an operating system on a bare metal server 902 and then configure the bare metal server 902 for use. Specifically, in some implementations, the installation and configuration time according to method 1300 is about one-third the typical time required for DU far edge use cases. Further, the installation and configuration time according to method 1300 is about one-half the typical time required for typical use cases. The methods 1200, 1300 support any operating system irrespective if its support kickstart technology. For example, the methods 1200, 1300 can support WINDOWS, UBUNTO, MAC OS, RHEL, CENTOS, FEDORA, LINUX, and so forth.

In an example traditional system, a typical operating system provisioning for a DU far edge use case takes about 30 minutes to complete. With the technique described in the method 1300, the bare metal server may be provisioned in 10 minutes or less. Further, a typical operating system provisioning takes about 20 minutes with traditional techniques. When the typical bare metal server is provisioned according to the method 1300, the time is reduced to about 10 minutes.

The systems described herein offer increased simplicity. A typical operating system provisioning kickstarter file is complex and may include each of a pre-section, an operating system installs, a post-section configuration, and one-time update services. With the systems and methods described herein, the operating system provisioning kickstarter file is simplified to include only the pre-section.

Figure 14:
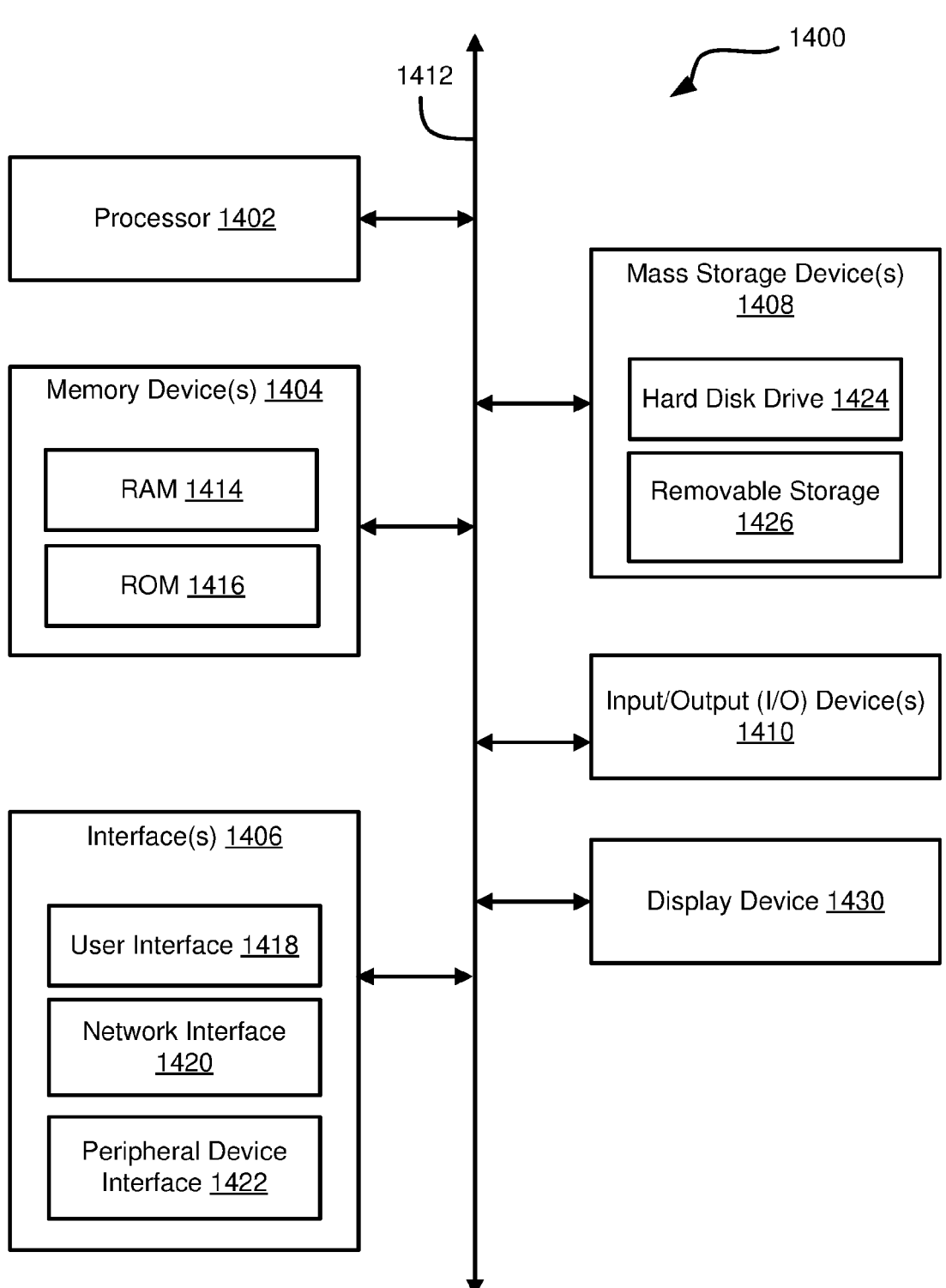
FIG. 14 is a schematic block diagram of an example computing device suitable for implementing methods in accordance with embodiments of the invention.

FIG. 14 illustrates a schematic block diagram of an example computing device 1400. The computing device 1400 may be used to perform various procedures, such as those discussed herein. The computing device 1400 can perform various monitoring functions as discussed herein, and can execute one or more application programs, such as the application programs or functionality described herein. The computing device 1400 can be any of a wide variety of computing devices, such as a desktop computer, in-dash computer, vehicle control system, a notebook computer, a server computer, a handheld computer, tablet computer and the like.

The computing device 1400 includes one or more processor(s) 1404, one or more memory device(s) 1404, one or more interface(s) 1406, one or more mass storage device(s) 1408, one or more Input/output (I/O) device(s) 1410, and a display device 1430 all of which are coupled to a bus 1412. Processor(s) 1404 include one or more processors or controllers that execute instructions stored in memory device(s) 1404 and/or mass storage device(s) 1408. Processor(s) 1404 may also include several types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device 1408 is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 may include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, or any suitable user interface now known to those of ordinary skill in the field, or later discovered), keyboards, and the like.

Bus 1412 allows processor(s) 1404, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1400 and are executed by processor(s) 1402. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method. The method includes capturing a disk image of a first bare metal server and writing the disk image to a repository manager. The method includes launching a continuous delivery mode on a second bare metal server. The method includes mounting the disk image to the second bare metal server. The method includes configuring a unique identity of the second bare metal server.

Example 2 is a system as in Example 1, further comprising receiving a request from a user to initiate a workflow to capture the disk image of the first bare metal server, wherein receiving the request comprises receiving the request by way of a dashboard rendered on a user interface.

Example 3 is a system as in any of Examples 1-2, further comprising submitting the workflow to a worker node, wherein the workflow comprises causing the worker node to launch a live continuous delivery mode on the first bare metal server without use of a dynamic host configuration protocol (DHCP).

Example 4 is a system as in any of Examples 1-3, further comprising receiving a request from a user to initiate a workflow to install an operating system on the second bare metal server by way of a disk image dump, wherein receiving the request comprises receiving the request by way of a dashboard rendered on a user interface.

Example 5 is a system as in any of Examples 1-4, wherein launching the continuous delivery mode on the second bare metal server comprises launching without use of a dynamic host configuration protocol (DHCP).

Example 6 is a system as in any of Examples 1-5, wherein capturing the disk image of the first bare metal server comprises: requesting an initialization file from a file store of the first bare metal server without using dynamic host configuration protocol (DHCP) or a DHCP server; and receiving the initialization file.

Example 7 is a system as in any of Examples 1-6, wherein capturing the disk image of the first bare metal server further comprises: installing, on the first bare metal server, a kickstarter executable; and executing the kickstarter executable to register the first bare metal server with a machine initialization module; wherein receiving the initialization file comprises receiving the initialization file from the machine initialization module over a network in response to registering the first bare metal server with the machine initialization module.

Example 8 is a system as in any of Examples 1-7, wherein configuring the unique identity of the second bare metal server comprises configuring one or more of an internet protocol (IP) address, gateway, domain name system (DNS), or hostname of the second bare metal server.

Example 9 is a system as in any of Examples 1-8, wherein mounting the disk image to the second bare metal server comprises streaming the disk image from the repository manager by way of a uniform resource locator (URL) associated with the disk image.

Example 10 is a system as in any of Examples 1-9, wherein mounting the disk image to the second bare metal server comprises downloading the disk image from the repository manager by way of the uniform resource locator and directly writing the downloaded disk image to disk storage resources associated with the second bare metal server.

Example 11 is a system including one or more processors each configured to execute instructions stored in non-transitory computer readable storage medium, the instructions comprising any of the method steps of Examples 1-10.

Example 12 is non-transitory computer readable storage medium storing instructions for execution by one or more processors, the instructions comprising any of the method steps of Examples 1-10.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
capturing a disk image of a first bare metal server while the first bare metal server is in a live continuous delivery mode;
writing the disk image to a repository manager;
launching a live continuous delivery mode on a second bare metal server via a bootloader;
mounting the disk image to the second bare metal server; and
configuring a unique identity of the second bare metal server.

2. The method of claim 1, further comprising receiving a request from a user to initiate a workflow to capture the disk image of the first bare metal server, wherein receiving the request comprises receiving the request by way of a dashboard rendered on a user interface.

3. The method of claim 2, further comprising submitting the workflow to a worker node, wherein the workflow comprises causing the worker node to launch the live continuous delivery mode on the first bare metal server without use of a dynamic host configuration protocol (DHCP).

4. The method of claim 1, further comprising receiving a request from a user to initiate a workflow to install an operating system on the second bare metal server by way of a disk image dump, wherein receiving the request comprises receiving the request by way of a dashboard rendered on a user interface.

5. The method of claim 1, wherein launching the continuous delivery mode on the second bare metal server comprises launching without use of a dynamic host configuration protocol (DHCP).

6. The method of claim 1, wherein capturing the disk image of the first bare metal server comprises:
requesting an initialization file from a file store of the first bare metal server without using dynamic host configuration protocol (DHCP) or a DHCP server; and
receiving the initialization file.

7. The method of claim 6, wherein capturing the disk image of the first bare metal server further comprises:
installing, on the first bare metal server, a kickstarter executable; and
executing the kickstarter executable to register the first bare metal server with a machine initialization module;
wherein receiving the initialization file comprises receiving the initialization file from the machine initialization module over a network in response to registering the first bare metal server with the machine initialization module.

8. The method of claim 1, wherein configuring the unique identity of the second bare metal server comprises configuring one or more of an internet protocol (IP) address, gateway, domain name system (DNS), or hostname of the second bare metal server.

9. The method of claim 1, wherein mounting the disk image to the second bare metal server comprises streaming the disk image from the repository manager by way of a uniform resource locator (URL) associated with the disk image.

10. The method of claim 9, wherein mounting the disk image to the second bare metal server comprises downloading the disk image from the repository manager by way of the uniform resource locator and directly writing the downloaded disk image to disk storage resources associated with the second bare metal server.

11. Non-transitory computer readable storage medium storing instructions for executing by one or more processors, the instructions comprising:

capturing a disk image of a first bare metal server while the first bare metal server is in a live continuous delivery mode;

writing the disk image to a repository manager;

launching a live continuous delivery mode on a second bare metal server via a bootloader;

mounting the disk image to the second bare metal server; and configuring a unique identity of the second bare metal server.

12. The non-transitory computer readable storage medium of claim 11, wherein the instructions further comprise receiving a request from a user to initiate a workflow to capture the disk image of the first bare metal server, wherein receiving the request comprises receiving the request by way of a dashboard rendered on a user interface.

13. The non-transitory computer readable storage medium of claim 12, wherein the instructions further comprise submitting the workflow to a worker node, wherein the workflow comprises causing the worker node to launch the live continuous delivery mode on the first bare metal server without use of a dynamic host configuration protocol (DHCP).

14. The non-transitory computer readable storage medium of claim 11, wherein the instructions further comprise receiving a request from a user to initiate a workflow to install an operating system on the second bare metal server by way of a disk image dump, wherein receiving the request comprises receiving the request by way of a dashboard rendered on a user interface.

15. The non-transitory computer readable storage medium of claim 11, wherein the instructions are such that launching the continuous delivery mode on the second bare metal server comprises launching without use of a dynamic host configuration protocol (DHCP).

16. The non-transitory computer readable storage medium of claim 11, wherein the instructions are such that capturing the disk image of the first bare metal server comprises:

requesting an initialization file from a file store of the first bare metal server without using dynamic host configuration protocol (DHCP) or a DHCP server; and receiving the initialization file.

17. The non-transitory computer readable storage medium of claim 16, wherein the instructions are such that capturing the disk image of the first bare metal server further comprises:

installing, on the first bare metal server, a kickstarter executable; and executing the kickstarter executable to register the first bare metal server with a machine initialization module;

wherein receiving the initialization file comprises receiving the initialization file from the machine initialization module over a network in response to registering the first bare metal server with the machine initialization module.

18. The non-transitory computer readable storage medium of claim 11, wherein the instructions are such that configuring the unique identity of the second bare metal server comprises configuring one or more of an internet protocol (IP) address, gateway, domain name system (DNS), or hostname of the second bare metal server.

19. The non-transitory computer readable storage medium of claim 11, wherein the instructions are such that mounting the disk image to the second bare metal server comprises streaming the disk image from the repository manager by way of a uniform resource locator (URL) associated with the disk image.

20. The non-transitory computer readable storage medium of claim 19, wherein the instructions are such that mounting the disk image to the second bare metal server comprises downloading the disk image from the repository manager by way of the uniform resource locator and directly writing the downloaded disk image to disk storage resources associated with the second bare metal server.

* * * * *